(12) United States Patent
Chong et al.

(10) Patent No.: US 10,045,390 B2
(45) Date of Patent: Aug. 7, 2018

(54) WIRELESS NETWORK WITH UNMANNED VEHICLE NODES PROVIDING NETWORK DATA CONNECTIVITY

(71) Applicant: Accenture Global Services Limited, Dublin 4 (IE)

(72) Inventors: Wei Weng Chong, Singapore (SG); Vikash Kumar Singh, Jharkhand (IN); Senthil Ramani, Singapore (SG)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 141 days.

(21) Appl. No.: 15/064,177

(22) Filed: Mar. 8, 2016

(65) Prior Publication Data
US 2016/0360562 A1 Dec. 8, 2016

(30) Foreign Application Priority Data

Jun. 4, 2015 (IN) .......................... 2810/CHE/2015
Jun. 5, 2015 (SG) .......................... 10201504438U

(51) Int. Cl.
*H04W 76/11* (2018.01)
*H04W 40/22* (2009.01)
(Continued)

(52) U.S. Cl.
CPC ........... *H04W 76/11* (2018.02); *H04L 67/327* (2013.01); *H04W 4/025* (2013.01); *H04W 4/06* (2013.01);
(Continued)

(58) Field of Classification Search
CPC .............. H04B 7/1851; H04B 7/18502; H04B 7/18506; H04B 7/18504; H04B 7/185;
(Continued)

(56) References Cited

U.S. PATENT DOCUMENTS 5,847,679 A 12/1998 Yee et al.
5,961,571 A 10/1999 Gorr et al.
(Continued)

FOREIGN PATENT DOCUMENTS

EP          2333479        6/2011
WO       2014/014850       1/2014

OTHER PUBLICATIONS

Axel BA ¼ Rkle et al., "Towards Autonomous Micro UAV Swarms," Journal of Intelligent and Robotic Systems; Theory and Applications—(Incorporating Mechatronic Systems Engineering), Kluwer Academic Publishers, DO, vol. 61, No. 1-4, Oct. 27, 2010, pp. 339-353.

(Continued)

*Primary Examiner* — Hassan Kizou
*Assistant Examiner* — Roberta A Shand
(74) *Attorney, Agent, or Firm* — Mannava & Kang, P.C.

(57) ABSTRACT

An unmanned vehicle (UV) system provides network data connectivity for terminals. UV nodes in the system may transmit and receive terminal data in a network of UV nodes and other nodes according to a routing protocol. The nodes may include fixed nodes or UV nodes with a wired or wireless network connection to a destination terminal. A UV node may receive data from a source terminal for transmission to the destination terminal, and when the UV node is within range of a node in the network connected the destination terminal, the UV node transmits the received data to the node within range for forwarding to the destination terminal via the network.

17 Claims, 7 Drawing Sheets

(51) Int. Cl.
*H04W 4/06* (2009.01)
*H04W 4/02* (2018.01)
*H04L 29/08* (2006.01)

(52) U.S. Cl.
CPC ............ *H04W 40/22* (2013.01); *H04L 67/12* (2013.01); *H04W 4/02* (2013.01)

(58) Field of Classification Search
CPC ............ H04L 2209/80; H04L 2209/84; H04L 67/327; H04W 4/046; H04W 84/005; H04W 40/244; H04W 40/28; H04W 76/11
See application file for complete search history.

(56) References Cited

U.S. PATENT DOCUMENTS

| | | | |
|---|---|---|---|
| 6,122,572 A | 9/2000 | Yavnai | |
| 7,912,633 B1 | 3/2011 | Dietsch et al. | |
| 8,670,747 B1 | 3/2014 | Muller et al. | |
| 9,087,451 B1* | 7/2015 | Jarrell | G08G 5/0069 |
| 9,170,117 B1* | 10/2015 | Abuelsaad | G01C 21/34 |
| 2006/0184292 A1 | 8/2006 | Appleby et al. | |
| 2006/0229773 A1 | 10/2006 | Peretz | |
| 2007/0021880 A1 | 1/2007 | Appleby et al. | |
| 2009/0195401 A1* | 8/2009 | Maroney | G06K 9/00335 340/686.6 |
| 2009/0219393 A1* | 9/2009 | Vian | G07C 5/008 348/144 |
| 2009/0222148 A1 | 9/2009 | Knotts et al. | |
| 2010/0269143 A1 | 10/2010 | Rabowsky | |
| 2011/0019558 A1 | 1/2011 | Rowe et al. | |
| 2011/0085033 A1 | 4/2011 | McDonald et al. | |
| 2011/0090888 A1 | 4/2011 | Arms et al. | |
| 2011/0186687 A1 | 8/2011 | Elder | |
| 2012/0152877 A1 | 6/2012 | Tadayon | |
| 2014/0172193 A1* | 6/2014 | Levien | B64C 39/024 701/2 |
| 2014/0236390 A1 | 8/2014 | Mohamadi | |
| 2014/0316616 A1 | 10/2014 | Kugelmass | |
| 2015/0170524 A1 | 6/2015 | Stefani et al. | |
| 2015/0234387 A1 | 8/2015 | Mullan et al. | |
| 2016/0042767 A1 | 2/2016 | Araya et al. | |
| 2016/0164619 A1* | 6/2016 | Sennett | H04H 20/08 455/404.1 |
| 2017/0046845 A1 | 2/2017 | Boyle et al. | |
| 2017/0131717 A1 | 5/2017 | Kugelmass | |

OTHER PUBLICATIONS

European Patent Office, "The Extended European search report", related European Patent Application No. 15154833.6, dated Jun. 19, 2015, 9 pages.

European Patent Office, "The Extended European search report", related European Patent Application No. 15154892.2, dated Jun. 19, 2015, 8 pages.

Pignaton De Freitas, Edison et al., 'UAV Relay Network to Support WSN Connectivity', 2010 International Congress on Ultra Modern Telecommunications and Control Systems and Workshops (ICUMT), 2010, 6 pages.

* cited by examiner

WIRELESS NETWORK WITH UNMANNED VEHICLE NODES PROVIDING NETWORK DATA CONNECTIVITY

PRIORITY

The present application claims priority to Indian patent application number 2810/CHE/2015, having a filing date of Jun. 4, 2015, and to Singaporean patent application number 10201504438U, having a filing date of Jun. 5, 2015 the disclosures of which are hereby incorporated by reference in their entireties.

BACKGROUND

Unmanned vehicles (UVs) such as aerial vehicles (e.g., Unmanned aerial vehicles (UAVs), or drones), land vehicles, etc. are typically operated without a human aboard and are used for a variety of operations. For example, UVs may be used for aerial surveillance (e.g., police/fire department, cartography, photography, film, journalism, real estate, etc.), exploration (e.g., mine detection, site survey, etc.), research (e.g., wildlife, atmosphere, ocean, etc.), remote sensing (e.g., telecommunications, weather, maritime, construction, etc.), package delivery (e.g., food, medicine, equipment, etc.), etc.

UVs may include the ability to receive instructions on how to perform a task, and then repeat the task until receiving instructions to stop performing the task, or based on the occurrence of an exception that the UV has been preprogrammed to respond to. An operator may monitor the status of the UV, and then report the results of the task following platform based UV's execution. Also, UVs may be semi or fully autonomous (e.g., "smart platform"). Semi or fully autonomous platforms may receive instructions related to a task. Based on real-time sensor data detected by the UV and a set of objectives that are specified by the instructions, the semi or fully autonomous platform based UV may be deployed to follow the instructions.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
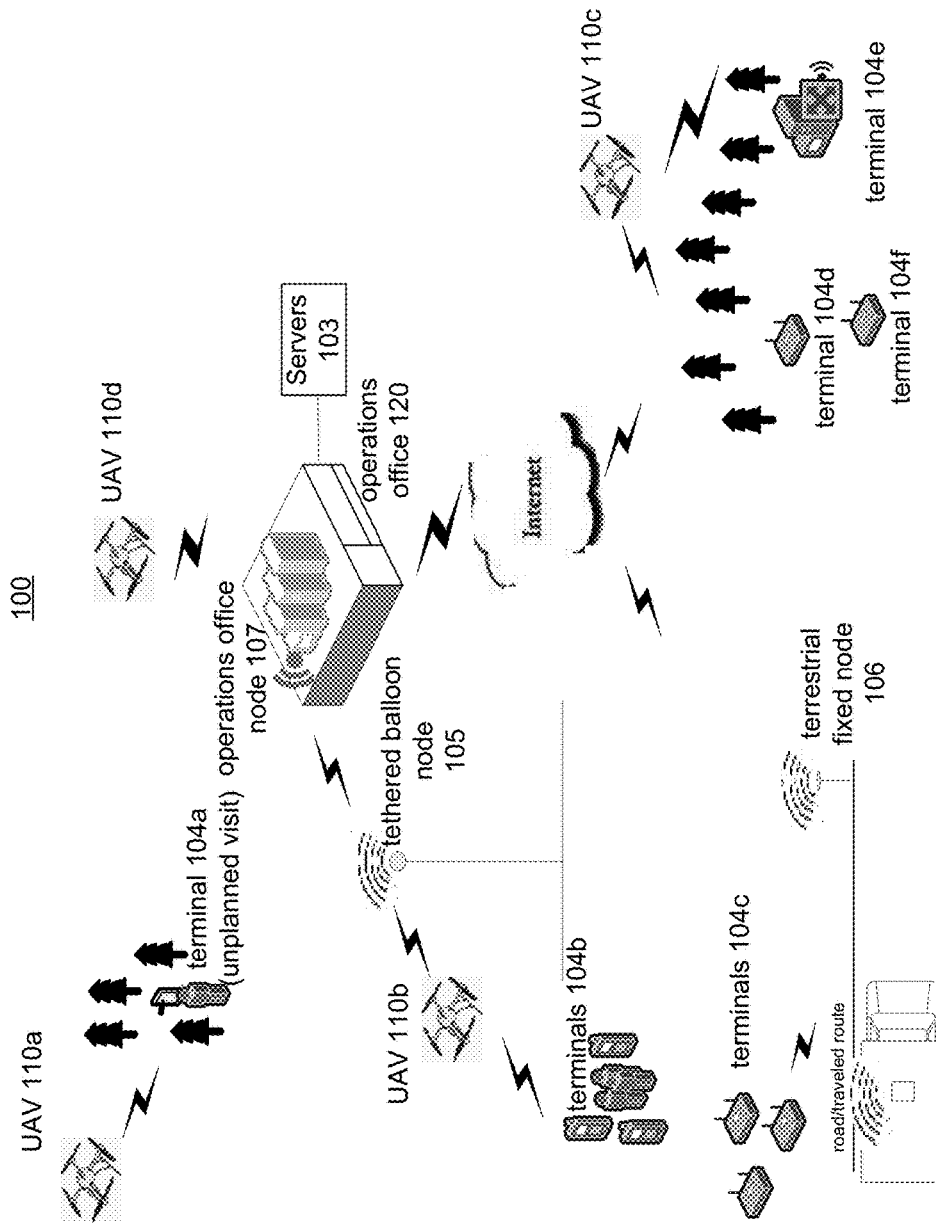
FIG. 1 illustrates a detailed architecture of a system, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Unmanned vehicles (UVs) such as aerial vehicles (e.g., Unmanned aerial vehicles (UAVs), or drones), land vehicles, or even collaborative robots are typically operated without a human aboard. UVs may be used in a variety of ambiguous environments, and for performance of a variety of ambiguous tasks.

According to embodiments described herein, UVs are used as wireless nodes in a network to provide network data connectivity for terminals which may be located in remote locations, such as for plantations, forestry or other remote areas or any other location. The UVs, which may include terrestrial or aerial UVs (e.g., UAVs), can establish connectivity with the terminals, which may include mobile or fixed devices, to provide online and offline data connectivity with servers or other computer systems, which may be provided at an operations office or home base where the UVs are launched or other locations remote from the terminals. Data connectivity may include transfer of any type of data over the network. In an example, the data includes data gathered from sensors. The data may include numeric data, audio data, images, video, etc. If real-time data connectivity is available, the data may include streaming data, such as streaming audio or video. Also, the data connectivity may include secured or unsecured communication, such as secured or unsecured communication between nodes or between nodes and terminals. Secure communication may be provided through encryption/decryption and exchange of keys. A UV that can operate as a node in the network is also referred to as a UV node. A network includes nodes that can route data to a destination. The routing may be performed according to a routing protocol, which may be based on a source and/or destination identifier, which may be a network address. In one example, the network is a mesh network and the routing may be performed by flooding to connected nodes or based on shared topology information and/or routing tables stored at each node that may be used to determine a next hop towards a destination. In another example, the routing protocol may be a spanning tree protocol.

The UVs may be mobile wireless nodes in a network to provide online and offline data exchange between terminals connected to the network. A node is an electronic device that may be connected to other nodes in the network and terminals through a communication interface, and is capable of creating, receiving, or transmitting information over a communications channel. The node may be capable of transmitting data toward a destination via another node according to a routing protocol. A node may be a mesh node in a mesh network capable of distributing data to other nodes in the network. A node may be fixed or mobile and may include wireless and/or wired communication interfaces. The nodes may include hardware and software, including the wireless and/or wired communication interfaces, to allow devices to perform operations of nodes in the network. A mesh network may include a network that is ad hoc where nodes may enter and leave the network. Some nodes may be fixed in the network rather than mobile. The nodes cooperate in the distribution of data in the network and can relay data, such as through routing or flooding protocols. A terminal may include an endpoint in the network or a device connected to the network, and may include an end user device, server or other type of computer that can communicate with nodes in the network via a communication interface to send our receive data. The terminals may include mobile or fixed devices. For example, the terminals may include mobile end user devices, such as laptops, smart phones, tablets, etc. The terminals may include sensors, such as water level sensors, temperature sensors, wind sensors, etc., with a network interface. The terminals may include fixed computer systems that monitor and/or control other devices, such as a water gate that is opened or closed to control water distribution.

According to an example, the system may include terrestrial and aerial UVs that are semi or fully autonomous and operate as mobile wireless nodes in the network to provide network data connectivity for the terminals. The UVs may communicate with other nodes or a computer system in a home base or an operations office at a particular geographic location. For example, there may be fixed nodes in the network that are connected to the operations office through a wired or wireless connection. When a UV is within range of a fixed node, data collected by the UV from remote terminals may be transmitted to the fixed node for transmission to the operations office for storage and analysis. The system may include terrestrial or aerial fixed nodes. In an example, tethered balloons may be deployed to operate as fixed nodes in the system that can relay data collected from UAVs to the operations office. Untethered balloons may be used as well for nodes. The untethered balloons may be remotely controlled from the operations office and may be maneuvered to predetermined locations as needed to operate as a node for a particular location.

Regarding network data connectivity for the terminals, the system can provide data connectivity in both directions (e.g., upload and download) for the terminals. For example, nodes may send data to terminals and receive data from terminals for transmission to a destination. The UVs may be preprogrammed to send particular data to particular terminals as part of a mission plan. The UVs may also receive data from the terminals for transmission to computer systems at the operations office and/or at other locations.

The UVs may provide network data connectivity based on planned and unplanned visits of terminals. For example, a UV may have a programmed route (e.g., a travel route over a geographic area) where terminals are expected to be located, such as in particular areas where sensors that are terminals are located or where field workers with terminals are located. The programmed route of the UV includes planned visits to these areas and terminals expected to be located in these areas to provide network data connectivity for these terminals. The UVs may also provide network data connectivity for unplanned visits. For example, the UVs may detect terminals while travelling on a preprogrammed route and these terminals may be in areas that are not expected to include a terminal or may include terminals not expected to be in a particular location. A UV detecting a terminal can enter in a data exchange with the terminal to identify the terminal as a "friendly" terminal and provide network data connectivity for the terminal.

The system may provide non-real-time and real-time network data connectivity. Non-real-time connectivity may be provided by UVs that can connect with a terminal to upload or download data. Data uploaded to a UV from a terminal is stored in the UV until the UV gets connectivity to another node, such as a fixed node, or the operations office or another UV that is a node. The delay for the UV to connect to another node or the operations office makes the connection non-real-time, however, the delay may not be extensive, such as less than sixty minutes. The network data connectivity may be real-time. For example, if a UV connects with a terminal and is within range of the operations office or another node that can connect to the destination, transmission may be in real-time.

Traditionally, network data connectivity is not available for remote areas, such as for forestry, logging, plantations, or other scenarios. For example, people would have to physically travel to the remote areas, which may take several hours, to communicate with field workers and devices in the field. Some of the remote areas may be in geographic areas with little or no infrastructure or in terrain, such as mountains, jungle, etc., that is difficult to traverse, and to reach these areas to communicate with field workers and devices in the field may take days. The system of the present application may provide network data connectivity for these remote areas and allow control of devices in these areas, such as control of mechanical actuators of an irrigation system or control of other devices, and allows for bidirectional communication with other devices and computer systems connected to the network.

FIG. 1 illustrates a system 100 according to an embodiment that includes UVs to provide network data connectivity. The system 100 may include a network comprised of nodes. The network may be a mesh network that is at least partially ad hoc. The nodes include wireless nodes and/or wired nodes that form the network. The UAVs 110 are mobile wireless nodes and include communication interfaces to communicate with terminals 104. The system 100 may include one or more terrestrial UVs, e.g., terrestrial UV 111, that are also mobile wireless nodes. The terrestrial UVs may be vehicles, such as cars or trucks. The system 100 may include fixed nodes. The fixed nodes may include tethered balloon 105 and terrestrial fixed node 106. For example, tethered balloon nodes can be released at particular locations as needed and may be stationed up to 1000 feet above their anchor point. Terrestrial fixed nodes may be fixed at predetermined locations along a travel route of UV nodes. A UV node includes a UV that can also operate as a node in the network. The fixed nodes or any other type of node may operate as a repeater for another node. The fixed node may include wireless and/or wired communication interfaces. For example, a fixed node may include a wireless communication interface to communicate with UV nodes, and may include a wired interface connected to a node in the operations office 120.

The fixed nodes may be the last hop in the network before an end node that is connected to a terminal. For example, the tethered balloon node 105 and the terrestrial fixed node 106 are connected to the operations office node 107 which is an end node connected to the computer systems of the operations office 120. A UV node can communicate with the node 105 or 106 instead of having to travel to the operations office 120 to download or upload data from the computer systems of the operations office 120. For example, UAV 110b may collect data from the terminals 104b, and transmit the data to the operations office 120 via the tethered balloon node 105 (which is connected to the operations office node 107), so the UAV node 110b does not need to return to the operations office 120 to do so.

FIG. 1 shows the Internet, which may be connected to any of the nodes or terminals in the system 100 if access to the Internet is available. Any public or private network, which may or may not include the Internet, may be connected to any of the nodes or terminals in the system 100 if access to the network is available. In an example, nodes in the Internet may be intermediate hops between a node in the system 100 and a destination which may be a node, terminal, operations office 120 or any device connected to the network of the system 100. For example, the tethered balloon node 105 may be connected to the Internet, and transmits packets including data from terminals 104b and UAV 110b to a destination, such as the operations office 120, via the Internet. In this example, the tethered balloon node 105 may generate TCP/IP packets for transmitting the terminal data over the Internet to the destination.

Terminals 104 can communicate with the nodes (e.g., nodes 110 and 111), which provide network data connectivity for the terminals 104. The terminals 104 may transmit data to a destination in the network, such as the operations office 120, or receive information from another terminal or device connected to the network via the nodes. The terminals 104 may include end user devices. For example, terminals 104a and 104b may include end user devices, such as laptops, smart phones, tablets, etc. The terminals 104 may include wireless sensors. For example, terminals 104c and 104d may include wireless sensors. The wireless sensors 104c and 104d monitor physical or environmental conditions, such as temperature, sound, pressure, water flow, etc. and transmit their data via the nodes in the network to the operations office 120 and/or other destinations. Terminal 104e may be connected to an actuator and may receive commands from the operations office 120 via a mobile node, such as UAV 110c, to control the actuator. The terminal 104e may also include a sensor and can transmit its sensor data to the operations office 120 via the UAV 110c. In an example, the terminal 104e is connected to a actuator to control opening and closing of a water flow gate. The terminal 104e may receive a command from the operations office 120 via the UAV 110c to raise or lower the gate and may include a water flow sensor to measure the water flow. The water flow sensor data may be transmitted to the operations office 120 via the UAV 110c to determine whether the water flow gate was raised or lowered in accordance with the command. A terminal may include any computer that can connect to the network to transmit or receive data via the network.

The operations office 120 may be a building or other structure and houses computer systems and nodes. The nodes may include wired and/or wireless nodes. The nodes may communicate with other nodes, such as other UV nodes or fixed nodes in the network. The computer systems of the operations office 120 may be connected to servers 103 via a network, such as the Internet or other public and/or private networks. The operations office 120 may be a home base for UV nodes. For example, UV nodes, such as UAVs 110a-d and terrestrial UV 111, may be launched from the operations office 120 to perform a mission and may return to the operations office 120 when the mission is completed. The UV nodes may be programmed with their missions and flight plans or travel routes at the operations office 120 and may be fueled or recharged at the operations office 120. Also, the UV nodes may download data collected from the terminals 104 to the computer systems at the operations office 120. Also, data and commands to be transmitted to the terminals 104 may be uploaded to the UV nodes at the operations office 120.

Data collected by the UV nodes may be stored at the computer systems of the operations office 120 and the servers 103 and may be analyzed. For example, sensor data may be analyzed to detect fire hazards, determine crop growth, determine locations of mobile terminals, etc. Commands may be generated and transmitted to the terminals via the UV nodes based on the analyzed sensor data.

The UV nodes may be programmed with travel routes and can communicate with terminals that are encountered on their travel routes. The UV nodes may be deployed in remote locations having terrain that is difficult to traverse to provide network data connectivity for terminals in those locations. The remote locations may include some travel routes. For example, for forestry or logging, some access roads may be created to allow terrestrial vehicles to reach particular job sites. Terrestrial UVs, such as terrestrial UV 111, may be programmed to travel on these roads to provide network data connectivity for terminals 104c within range of the roads. Also, data collected from the terrestrial UVs may be transmitted to the operations office 120 via the terrestrial fixed node 106, which may be connected to the operations office 120 via a wired connection. The UAVs 110a-d may be programmed with travel routes that are more difficult to traverse on land to provide network data connectivity for terminals encountered on their travel routes.

Network data connectivity may be provided by the UV nodes for terminals encountered during planned or unplanned visits. For example, the UAV 110a may detect terminal 104a on its travel route but the UAV 110a may not be expecting to encounter terminal 104a (i.e., unplanned visit). The UAV 110a may determine whether the terminal 104a is a "friendly terminal" and establish a connection with the terminal 104a if it is friendly. Establishing a connection between nodes or between nodes and terminals for example includes the nodes and/or terminals permitting transmitting or receiving of data to or from the nodes or terminals. For example, once a connection is established between the UAV 110a and terminal 104a, the terminal 104a may send data to the UAV 110a for transmitting in the network to a destination, and the UAV 110a receives the data and forwards the data to the destination. If needed, the UAV 110a may adjust its flight plan or call for another UAV to provide the necessary network data connectivity for the terminal 104a as is further described below with respect to unplanned visits. UAV 110b, UAV 110c and UV 111 may provide network data connectivity for terminals 104b, terminals 104d-f, and terminals 104c, respectively, during planned visits. Details on providing network data connectivity for planned visits are further described below.

Figure 2:
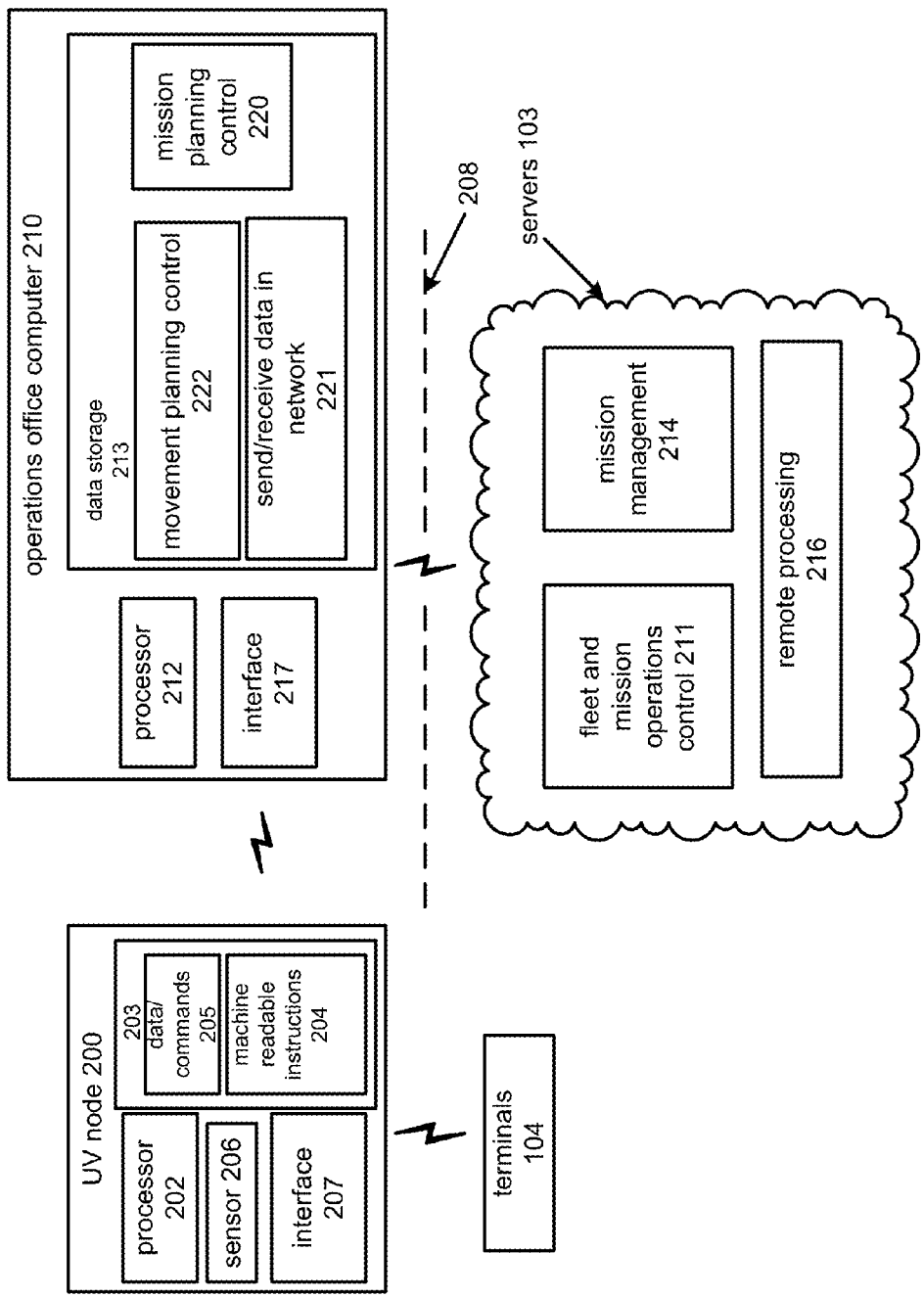
FIG. 2 illustrates details of the components of the system of FIG. 1, according to an example of the present disclosure.

FIG. 2 shows a block diagram of components of the system 100 shown in FIG. 1. UV node 200 may include any of the UV nodes shown in FIG. 1, such as UAVs 110a-d or UV 111. The UV node 200 includes a UV, which may be any type of UV, including aerial, land, space, and marine UVs. The UV node 200 may take off (e.g., for a UAV), navigate, capture data, transmit collected data, return, and land without human interaction.

The UV node 200 may include a hardware processor 202, sensor 206, communications interface 207 and a non-transitory data storage 203. The processor 202 for example is an integrated circuit. The processor 202 may be a chipset with central processing unit and/or custom processing circuits, such as an application-specific integrated circuit (ASIC) or field-programmable gate array (FPGA). The processor 202 may execute machine readable instructions 204 to perform the operations of the UV node 200. The operations may include sensor data processing for analog and digital input/output (I/O), kinematics (e.g., position and orientation of objects), proportional-integral-derivative (PID) feedback control, rules application (e.g., if this, do that), navigation (e.g., move to a waypoint), mission execution (e.g., manage multiple waypoints), telemetry management (e.g., summarizing telemetry data captured from wireless sensors), counter, and data management (e.g., memory, disk, etc.). The processor 202 may provide for outputs such as movement, motors (e.g., servos, stepper, brushless), hydraulics, pneumatics, gravity release, visual indicators/feedback, LEDs, LCDs, displays, audio indicators/feedback, speaker, buzzer, etc., voltage change (e.g., not in use, go to low power mode), and external communication subsystems (e.g., radio, IR codes). The processor 202 also includes capabilities of encryption/decryption and exchange of keys for secure communications. In an example, public/private key encryption may be performed by the processor 202 to encrypt data transmitted to a node. Any of the nodes or terminals may encrypt/decrypt data for transmission in the network. The processor 202 also executes other functions described herein to provide network data connectivity for the terminals 104.

The sensor 206 may include sensors to gather data associated with a mission. The sensor 206 may include a variety of types of sensors that may be categorized as sight sensors, sound sensors, touch sensors, smell sensors, position sensors, external communication sensors, proximity sensors, and other (e.g., miscellaneous sensors). The sight sensors may include sensors for ascertaining light intensity, color, distance (e.g., by infrared (IR), measuring angle of light bounce), video capture, rotation (e.g., optical encoders), and/or light signal read (e.g., infrared codes). The sound sensors may include sensors (e.g., a microphone) for ascertaining volume (e.g., decibel meter), frequency measurement, and/or distance (e.g., sonar, measuring time to echo). The touch sensors may include sensors for ascertaining position awareness (e.g., collision alert, contact confirmation, etc.), bend/strain, temperature, and/or pressure (e.g., barometric, grip strength, etc.). The smell sensors may include sensors such as gas sensors, alcohol sensors, etc. The position sensors may include sensors (e.g., accelerometer, digital compass, gyroscope) for ascertaining location (e.g., based on global positioning system (GPS), proximity to a beacon, etc.), and/or tilt. The external communication sensors may include sensors for ascertaining radio communication, and/or IR codes. The proximity sensors may include sensors to ascertain nearness in space, time, and/or relationship. The sensors may include network communication status, and/or voltage (e.g., low fuel, low battery) sensors. The UV node 200 need not include all the sensors described above and may include one or more of the sensors needed to provide network data connectivity for the terminals 104. As discussed above, the terminals 104 may include sensors to measure and collect environmental or other types of data, and the UV node 200 can collect this data to transmit it to a destination.

The communications interface 207 may include one or more network interfaces for connecting to the terminals 104 and other nodes in the network. The communications interface 207 may include a transceiver and may include an antenna for wireless communication. The communications interface 207 may include wireless and/or wired network interfaces. The communications interface 207 may include a Wi-Fi interface or other wireless or wired interfaces. The communications interface 207 may include shorter range communication interfaces, such as Bluetooth or Zigbee interfaces.

The data storage 203 may include hardware storage devices that are volatile and/or non-volatile. Some examples of the data storage devices may include RAM (random access memory), ROM (read only memory), EPROM (erasable, programmable ROM), EEPROM (electrically erasable, programmable ROM), hard drives, flash memory, etc. The data storage 203 may store the machine readable instructions 204. The data storage 203 may store data and commands 205. The data may include data collected from the terminals 104 for transmission to a destination, such as the operations office computer 210. The data or commands may include information downloaded to the terminals 104, such as commands described with respect to terminal 104e to control an actuator or to perform some other function.

The operations office 120 may include operations office computer 210. Similar to the terminals 104, the operations office computer 210 is a computer connected to the network comprised of the UV nodes 110 and fixed nodes. The terminals 104 may bi-directionally communicate with the operations office computer 210 via the nodes. The operations office computer 210 may receive data collected by the UV nodes or fixed nodes from the terminals 104 and process the data and/or send the data to servers 103. Also, operations office computer 210 may send data and commands to the terminals 104 via the UV nodes or fixed nodes.

The operations office computer 210 may include or be connected to a node, such as the node 107 shown in FIG. 1. For example, the operations office computer 210 may include a communications interface 217, similar to the communication interface 207 of the UV node 200 to connect to the network. The operations office computer 210 may include a processor 212 and data storage 213. The processor 212 for example is an integrated circuit. The processor 212 may be a chipset with central processing unit and/or custom processing circuits, such as an application-specific integrated circuit (ASIC) or field-programmable gate array (FPGA). The processor 212 may execute machine readable instructions stored in the data storage 213 to perform the operations of the operations office computer 210.

The data storage 213 may include hardware storage devices that are volatile and/or non-volatile. Some examples of the data storage devices may include RAM (random access memory), ROM (read only memory), EPROM (erasable, programmable ROM), EEPROM (electrically erasable, programmable ROM), hard drives, flash memory, etc. The data storage 213 may store any data used by the operations office computer 210 including data received from the terminals 104 via the nodes.

Operations of the operations office computer 210 may be performed by the processor 212 executing machine readable instructions stored in the data storage 213. Examples of operations performed by the operations office computer 210 may include transmitting data to the terminals 104 via the mesh network and receiving data from the terminals 104 via the network. This is shown as send/receive data in network 221. The operations may include mission planning control 220 that enables a UV node to be programmed to run autonomously. The UV node may be equipped with sensors and intelligence to maintain altitude and a stabilized flight (e.g., for an aerial UV), and to determine the position and altitude of the UV at any given point in time. This enables the UV to navigate between two programmed points according to pre-defined waypoints, without any human interaction during the flight (e.g., for an aerial UV). Movement planning control 222 may be used to launch the UV, and control the UV flight path (e.g., for a UAV) and associated sensors.

The servers 103 may be connected to the operations office computer 210 via a network 208 shown as a dashed line. In an example, the servers 103 may be in a data cloud. The servers 103 may include servers for performing functions 211, 214 and 216 described below. The servers 103 may include hardware and software not shown, such as processors and non-transitory data storage that can store machine readable instructions executable by the processors. The servers 103 can provide remote processing 216 of data collected from the terminals 104 via the nodes of the mesh network. Processing of the terminal data may also be performed at the operations office computer 210.

The servers 103 may perform fleet and mission operations control 211. The fleet and mission operations control 211 may receive work orders, which specify operations for missions to be performed by the UV nodes and which are programmed into the UV nodes for example by the operations office computer 210. The programmed operations may be determined based on the information collected from the terminals 104, such as to gather more data at problematic locations or to control actuators at particular operations. The servers 103 may perform mission management 214, such as maintaining information regarding UVs and wireless sensors at the terminals 104. For example, mission management 214 may track UVs by type, availability, and an ability to mount particular sensors.

The fleet and mission operations control 211 may operate in conjunction with the mission management 214 to convert UV work orders to a mission parameters to programmed into a UV node. For example, for a UAV node, the parameters may specify a flight time, a flight plan, equipment (e.g., the specific UV, sensors, and any UV operation crew). The flight plan may include a launch point, predefined way points, alternate rally points, payload requirements, video or other data gathering requirements, payload operation instructions, commands for terminals and/or mission objectives.

The mission management 214 may schedule and assign the mission. Specifically the mission manager 112 may assign the UV node (or a plurality of UV node) for a mission. Mission planning control 220 receive the mission parameters from the mission management server, and program the assigned UV node. The UV node may follow the movement plan autonomously or with varying degrees of remote operator guidance from the movement planning control 222.

Figure 3A:
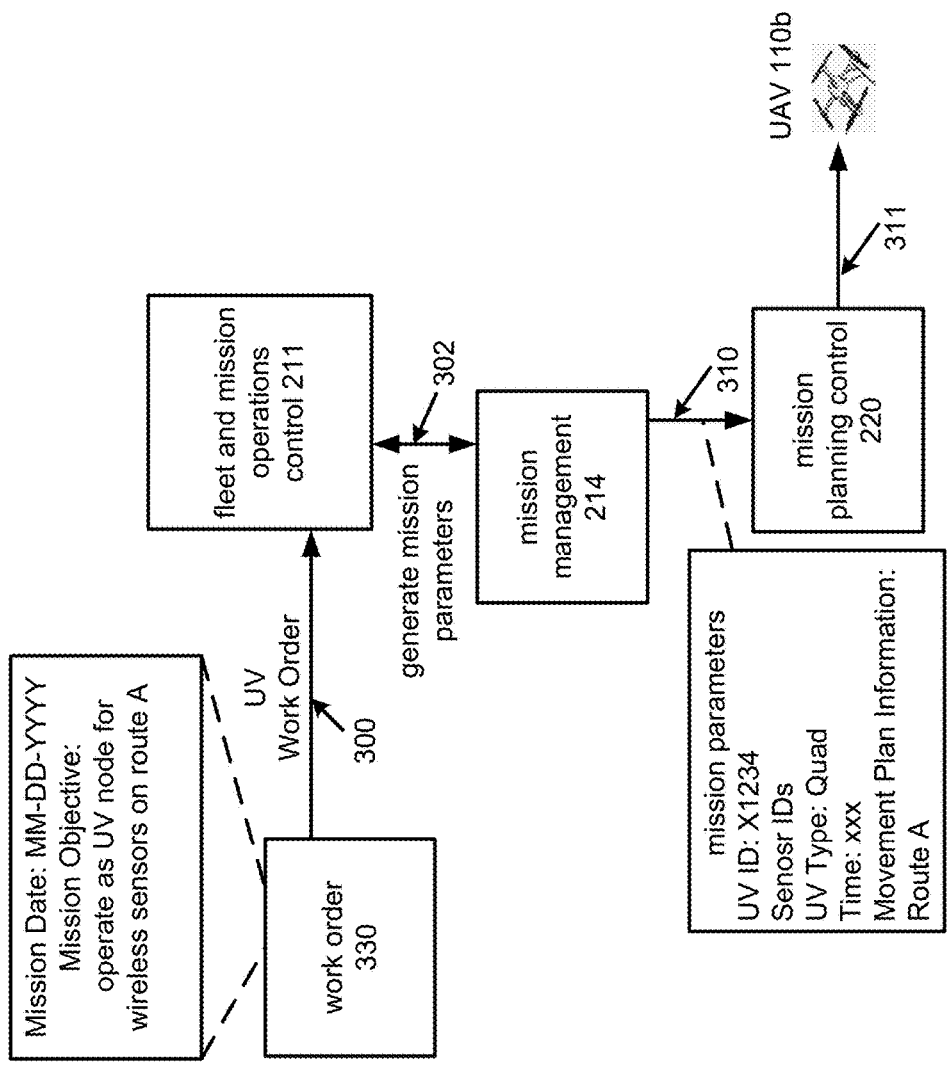
FIGS. 3A-3C illustrate operations of the system of FIG. 1, according to an example of the present disclosure.
Figure 3B:
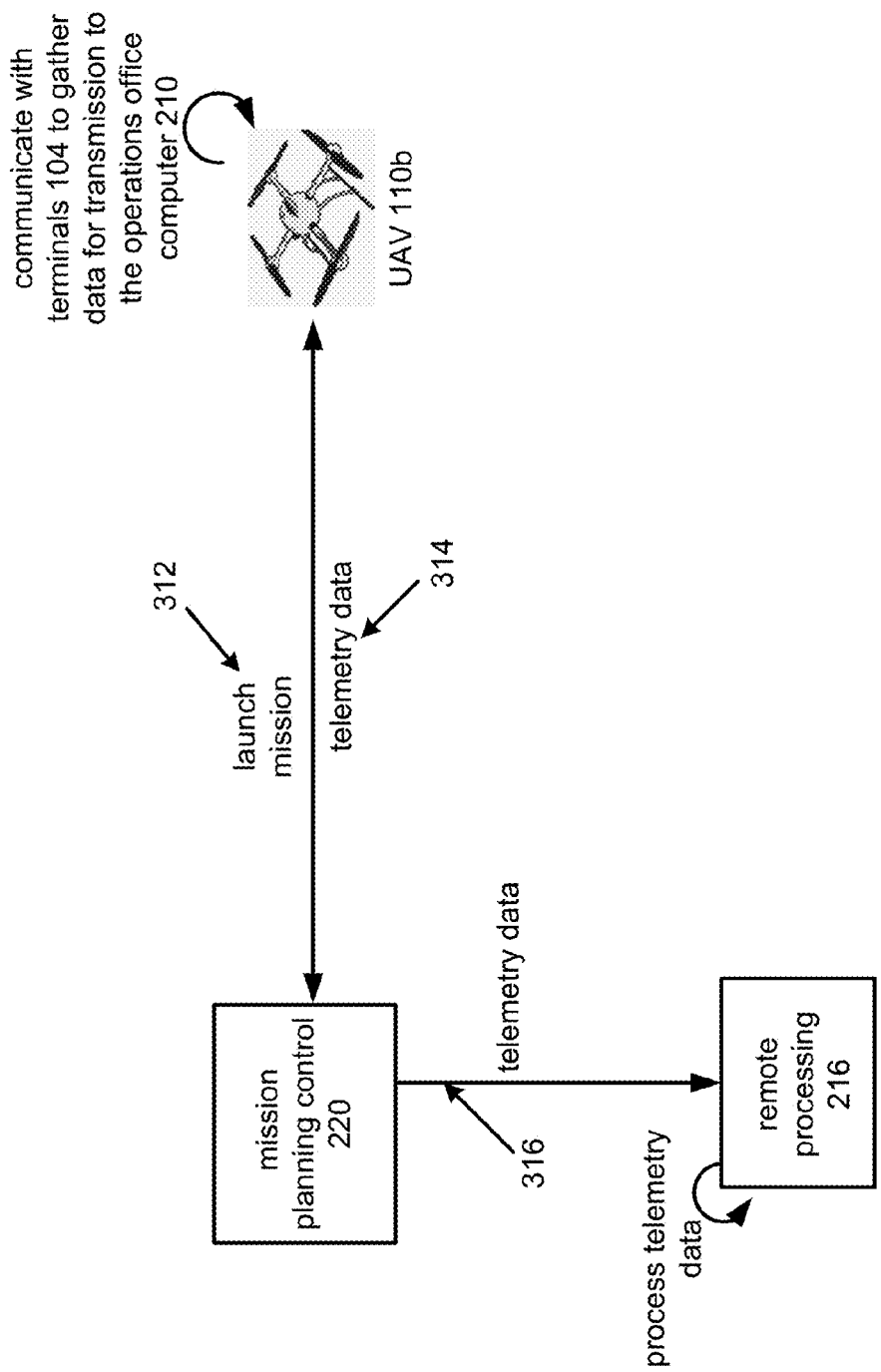
Figure 3C:
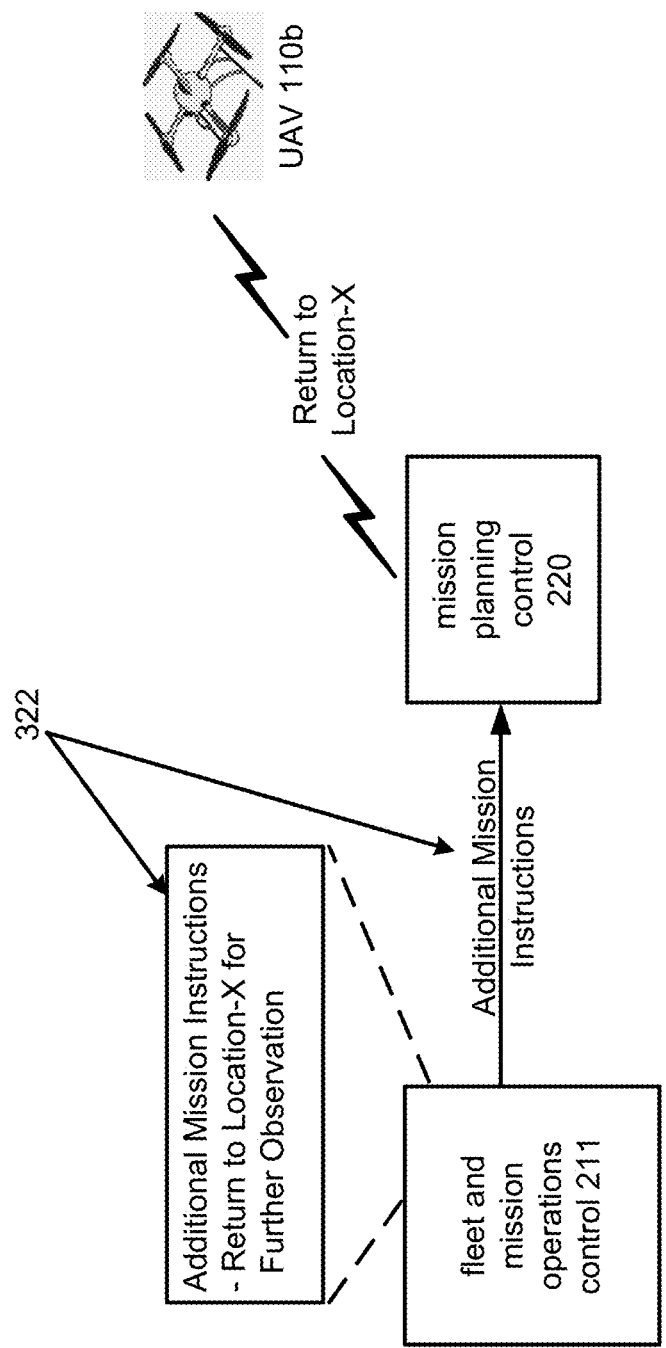

FIGS. 3A-3C illustrate data flow diagrams for examples of operations of components of the system 100. Referring to FIG. 3A, at 300, a UV work order 330 may be received for fleet and mission operations control 211, and the work order may be generated by a user or a computer. The UV work order 330 may include, for example, a mission date, a mission time, and/or a mission objective (e.g., operate as UV node for wireless sensors on route A).

At 302, the fleet and mission operations control 211 may convert the UV work order 330 to mission parameters, which may be determined based on a time for a mission, and include aspects related to compliance requirements for the mission, selection of the UV node and specification of a required movement path. The mission parameters may be sent to the mission management 214 for further analysis.

At 310, the mission parameters may be forwarded to the mission planning control 220. The mission planning control 220 at 311 may program the selected UV node of the correct type (e.g., quad copter UAV) with the mission parameters including movement plan information such as launch point, predefined way points and alternate points, payload requirements, payload operation instructions, and mission objectives. In this example, the type of UAV selected is a quad copter which has hovering capability. Another example of a type of UAV is a fixed wing UAV. Other types of UVs may also be selected. At the mission controller 102, the mission planning controller 120 may generate a display of the mission requirements. The mission planning controller 120 may further generate the display of the objectives for the mission, and a movement path for the mission.

Referring to FIGS. 3B and 3C, at 312, the mission controller 102 may launch the mission and gather data via the network. With respect to launch of the mission, the mission planning control 220 may program and launch the UV 110b on route A. The UV 110b gathers data from terminals 104 encountered on route A (e.g., planned/unplanned visits) for transmission to the operations office computer 210. At 314, terminal data including telemetry data may be received at the operations office computer 210 from the UV 110b when it returns from completing route A. Alternatively, the terminal data may be received from a fixed node on route A that received the gathered terminal data from the UV 110b. The mission planning control 220 may send the terminal data to the servers 103 for remote processing 216 at 316.

In FIG. 3C, at 322, if deemed appropriate, the fleet and mission operations control 211 may send instructions to the mission planning control 220 to program the UAV 110b, which may be done via nodes in the network when the UAV 110b is in flight or when the UAV 110b is docked to the operations office computer 210. For example, the instructions may modify a travel route, such as return to a location X, or some other instruction. The new instruction may be determined based on previously transmitted terminal data.

Figure 4A:
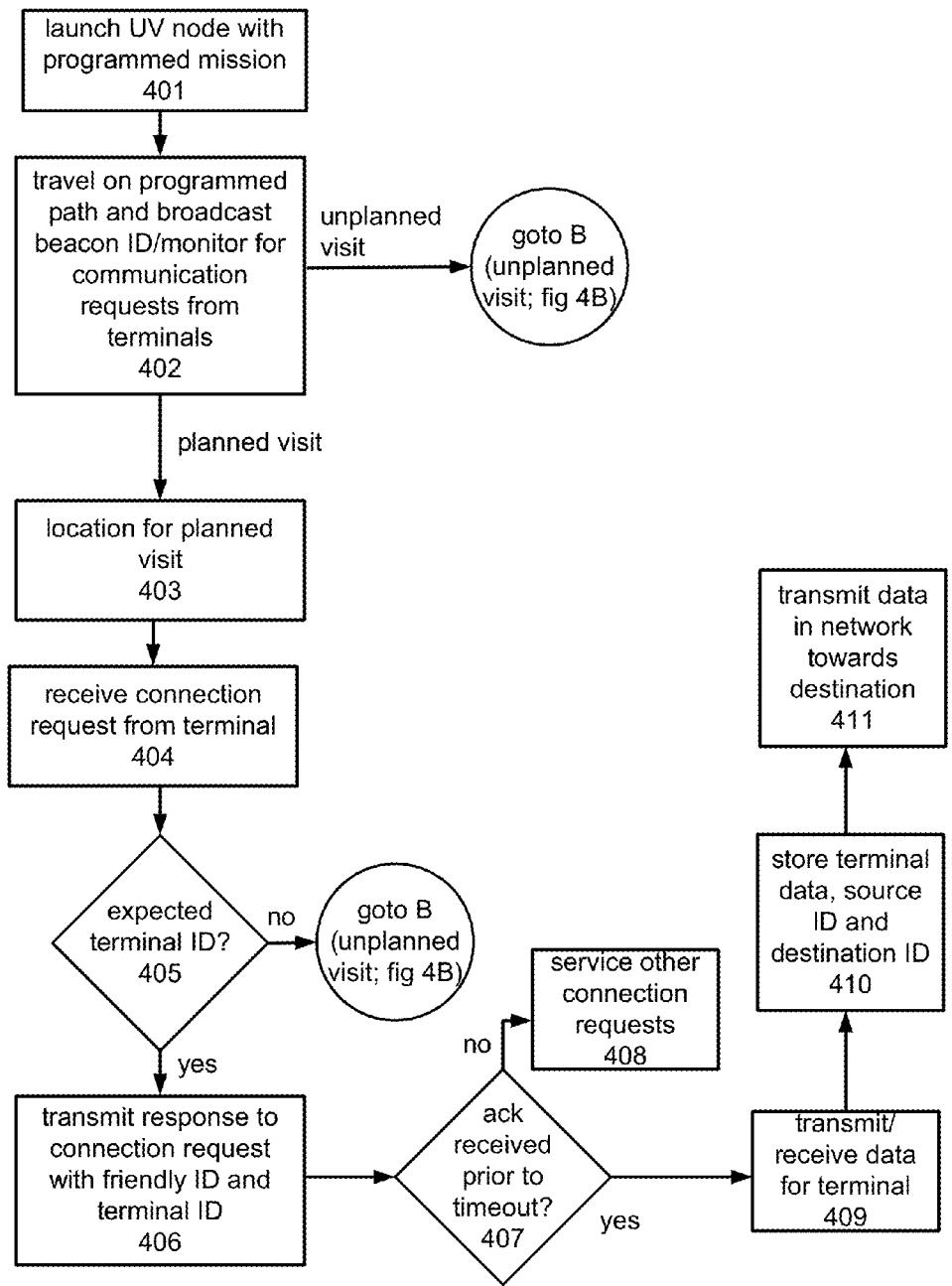
FIGS. 4A-B illustrate a flow chart of a method for providing network data connectivity for terminals, according to an example of the present disclosure.
Figure 4B:
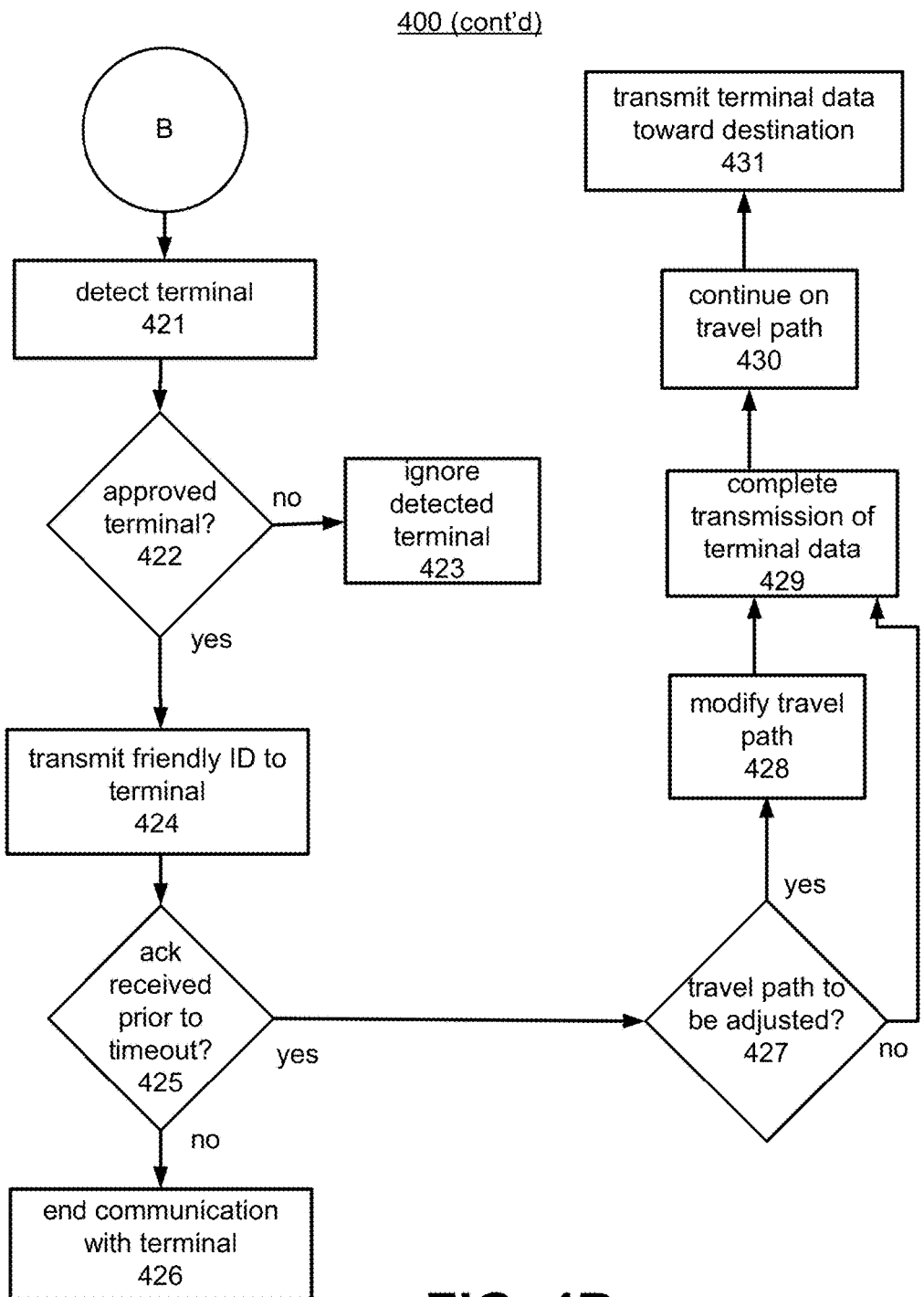

FIGS. 4A-B illustrate a flow chart of a method 400 for providing network data connectivity for terminals, according to an embodiment. The method 400 is described by way of example with respect to the system 100 shown in FIG. 1. At 401, a UV node is launched and is programmed with a mission. For example, one or more of UAV 110a-c and UV 111 are launched and are programmed with mission parameters, including a travel route and terminals expected to be at predetermined locations or waypoints along the route (e.g., planned visits).

The UV node may store terminal identifiers (IDs) of the terminals that it is expected to communicate with for planned visits and may store terminal IDs of other terminals in the system 100 and/or a "friendly" identifier that identifies a terminal as being part of the system 100 for unplanned visits. The terminal IDs and the friendly ID may be used to establish a secure connection between the UAV 110a and terminals that it encounters during flight and may be securely stored in the terminals and the UAV node 110a to prevent unauthorized access. The UAV 110a may also store a beacon ID that is periodically broadcasted during flight so terminals can determine when the UAV 110a is within range.

Also, the UV node may store commands to transmit to particular terminals. For example, the UV node may store a terminal ID and command for each command to be transmitted to the associated terminal. The command may be an instruction to perform an operation at the terminal. For example, a terminal ID of terminal 104e is stored along with a command to execute an operation, such as raise water gate one meter.

At 402, the UV node travels on its programmed path and broadcasts a beacon ID that is identifiable to terminals 104 in the system 100. Any of the terminals 104 that receive the broadcasted beacon ID determine that a UV node is within range and can initiate communication with the UV node to transmit data in the network of nodes to a destination device connected to the network. The beacon ID and other communications may be transmitted/received via communications interface 207 shown in FIG. 2 of the UV node. The beacon may be periodically or continuously broadcasted when the UV node is travelling on its programmed path. If the UV node engages in communication with a terminal, the broadcasting of the beacon ID may be stopped until the communication is completed.

Also, at 402, the UV node is monitoring for received communication requests from any of the terminals 104 that may be transmitted from a terminal receiving the beacon ID to initiate communication with the UV node.

Planned visits may happen at predetermined locations on the travel path of the UV node. Unplanned visits may happen at any location on the travel path of the UV node and at any time during transit on the travel path. Steps 403-411 show steps for a planned visit with a terminal at a predetermined location on the travel path.

At 403, the UV node determines that it is at a location for a planned visit where the UV node is expected to communicate with a terminal. Expected terminal IDs and corresponding locations may be stored in the UV node as mission parameters. At 404, the UV node receives a connection request from a terminal. The terminal may send the connection request in response to receiving the broadcasted beacon ID from the UV node. The connection request may include the terminal ID. For example, the UV node is near terminal 104*d* and terminal 104*d* receives the beacon ID of the UV node and transmits a connection request with its terminal ID.

At 405, the UV node determines whether the terminal ID in the connection request is an expected terminal ID for the current location for example by comparing the received terminal ID with any expected stored terminal IDs for the current location to determine if there is a match. The current location may be detected by the UV node through global positioning system (GPS) or through other location detection sensors.

At 406, if the terminal ID is an expected terminal ID for the current location, the UV node transmits the friendly ID. The transmission may also include the received terminal ID (e.g., terminal ID for terminal 104*d*) so terminal 104*d* sending the connection request determines the communication is a response to its connection request versus another connection request that may have been sent by another terminal in the vicinity, such as terminal 104*e* or 104*f*. Terminal 104*d* receives the response to the connection request, including the friendly ID and its terminal ID. Terminals 104*e* and 104*f* may ignore the response since the response message does not include their terminal IDs. The terminal 104*d* determines that the response is for its connection request because it includes its terminal ID. The terminal 104*d* determines whether the friendly ID matches a friendly ID stored in the terminal 104*d*. If yes, the terminal 104*d* sends an acknowledgment (ack) to the UV node to confirm that a connection to the network of nodes is established and that the terminal ID will be sending data to be transmitted to a destination via the network. If the friendly ID does not match a friendly ID stored in the terminal 104*d*, the terminal 104*d* does not send an ack message.

At 407, the UV node determines whether it receives an ack message from the terminal 104*d* within a predetermined period of time of sending the response at 406. The predetermined period of time is a timeout period and may be 10-15 seconds or some other suitable time period. If the ack message is not received from the terminal 104*d* prior to expiration of the time period, other received connection received requests, if any, are serviced for the current location in accordance with the steps of the method 400 at 408.

If the ack message is received from the terminal 104*d* prior to expiration of the time period, at 409, the UV node transmits data to the terminal 104*d* and/or receives data from the terminal 104*d*. For example, the UV node may store data or commands to transmit to terminals. If data or a command is stored for the terminal 104*d*, the data or command is transmitted to the terminal 104*d*. The terminal 104*d* may have data to send on the network to a destination. For example, the data may include sensor data, such as wind, water, temperature or other measurements. The sensor data is transmitted to the UV node and received by the UV node. The data may include a destination ID of the destination of the data for transmission in the network. The destination ID may be an Internet Protocol (IP) address or some other destination ID. In an example, the destination ID may be an ID for the operations office computer 210. At 410, the data, along with a source ID (e.g., ID of terminal 104*d*) and a destination ID are stored in the UV node.

The UV node may transmit the data from the terminal 104*d* to another node in the network toward the destination or to the destination when within range at 411. The transmission from the source (e.g., terminal ID 104*d*) to the destination (e.g., operations office computer 210) may be multi-hop. The multi-hop transmission includes transmitting the data from the source to the destination via multiple nodes (e.g., UV nodes and/or fixed nodes) in the network. For example, the UV node may be using a WiFi interface with limited range, such as 20-30 meters. The UV node may transmit the data to a fixed node connected to the destination when the UV node is within range of the fixed node (e.g., node 105 or 106 in FIG. 1). The fixed node may forward the data to the destination or via another node towards the destination. The UV node may transmit the data to the destination via any node in the network that is connected or connectable to the destination. For example, the UV node may transmit the data via another UV node that is in route towards the destination. For example, the UV node may detect another UV node that is in flight, and exchange messages with the UV node to determine whether it is traveling toward the destination in its current travel path. If the detected UV node is determined to be traveling toward the destination, the UV node transmits the terminal data to the detected UV node. The detected UV node may transmit the data to the destination via another node or directly to the destination.

If the UV node does not detect other nodes during its travel path, the UV node may transmit the data to the destination when the UV node returns to the operations office. If the operations office is the destination, the data is downloaded to the operations office computer 210 for example when the UV node returns to the operations office, and transmission of the terminal data to the destination is completed.

The destination can be a destination other than the operations office computer 210. For example, the destination may be one of the servers 103, and the terminal data is transmitted to the server using the destination ID of the server. The destination may be another terminal connected to the network. For example, terminal 104*e* may use sensor data from one of terminals 104*c* and terminal 104*d* to determine whether to execute an operation. The UV nodes and/or fixed nodes may be used to transmit data from the terminals 104*c* and terminal 104*d* to the terminal 104*e*.

The UV node may adjust its flight or travel path to facilitate communication with terminals. For example, if foliage is dense, a UAV node may reduce it altitude to get closer to a terminal. Signal strength may be used to determine whether to adjust altitude. A UAV node may hover or circle back to a terminal if it is fixed wing to complete a data transmission with a terminal Also, if needed, a UAV node may change its travel path or flight plan. For example, if data transmission from terminals to the UV node is taking longer than expected, the UV node may return to the operations office before fully completing its travel path if its power supply falls below a threshold.

FIG. 4B includes steps for unplanned visits, which may occur at any time during the UV node travel on its travel path. At 421, a terminal is detected, such as terminal 104a shown in FIG. 1. The terminal may be detected at a location that is not for a planned visit or the terminal may be detected at a location of a planned visit but the terminal is not expected to be at that location. The terminal may be detected by receiving a connection request from the terminal, such as described at 404. The connection request may include the terminal ID of the terminal.

At 422, the UV node determines whether the terminal is an approved terminal. For example, the UV node stores terminal IDs of the terminals in the system 100 that the UV node is allowed to communicate with. The UV node determines whether the terminal ID in the connection request matches a stored terminal ID of approved terminals. If the received terminal ID does not match, the connection request is ignored at 423. If there is a match, at 424, the UV node transmits the friendly ID to the terminal, similar to 406. The terminal receives the response to the connection request, including the friendly ID. The terminal determines whether the friendly ID matches a friendly ID stored in the terminal. If yes, the terminal ID sends an acknowledgment (ack) to the UV node to confirm that a connection to the network of nodes is established and that the terminal will be sending data to be transmitted to a destination via the network. If the friendly ID does not match a friendly ID stored in the terminal, the terminal does not send an ack message.

At 425, the UV node determines whether it receives an ack message from the terminal within a predetermined period of time of sending the response at 424. The predetermined period of time is a timeout period and may be 10-15 seconds or some other suitable time period. If the ack message is not received prior to expiration of the time period, the communication with the terminal may be ended at 426 or the UV node may try to re-send the response message from 424 a predetermined number of times before ending communication.

If the ack message is received from the terminal 104d prior to expiration of the time period, at 427, the UV node determines whether its travel path needs to be adjusted. For example, assume the UV node is communicating with the terminal 104a for the unplanned visit. The UV node exchanges messages to determine an amount of data to be received from the terminal for transmission in the network towards a destination and estimates an amount of time to complete the transmission of the data from the terminal 104a to the UV node. The UV node may need to circle back to the terminal 104a if it is a fixed wing UAV if the transmission of the amount of data will exceed the time it is within range of the terminal 104a. If the UV node has hovering capability, it may hover at the location of the terminal 104a to complete the transmission.

The UV node may also estimate whether it can complete its mission and travel path given the time spent for the unplanned visit or whether it needs to adjust its travel path, such as cutting it short. For example, the UV node may have a limited power supply (e.g., battery, fuel, etc.). The UV node determines whether it has a sufficient power to complete the travel path or whether it needs to shorten the travel path.

In another example, the terminal 104a may send a notification to the UV node that it is in an emergency situation. The notification may be a predetermined code designating an emergency situation. In this case, the UV node determines the terminal 104a is an emergency situation based on the received notification and may immediately return to the operations office 120 to provide notification of the emergency situation.

At 428, the travel path is modified if needed, and at 429, the UV node completes the transmission of the data from the terminal 104a to the UV node. At 430, the UV node continues with the travel path, which may be the modified travel path. Similar to discussed with respect to steps 410 and 411, at 431, the data received from the terminal 104a may be transmitted towards its destination. The data may be transmitted via other nodes to its destination.

The method 400 provides network data connectivity for terminals so they can transmit and receive data via the network. The network data connectivity may be non-real time. For example, if the node receiving the data from the terminal is not within range of another node that is connected to the destination, the transmission is delayed until such a node receives the data for transmission to the destination. If the node is connected to the destination, such as a fixed node connected to the destination or a UV node within range of the fixed node, then the transmission may occur in real-time or near-real-time. The UV node may receive the data from the terminal and moves to the closest access point, such as a fixed node, to relay the information for the terminal to its destination. The UV node may store locations of fixed nodes so it can determine the closest access point to the network. A UV node may determine that a node is a fixed node that is able to provide real-time network data connectivity for example by storing node IDs of fixed nodes. A UV node may enter into a data exchange with anode node to determine the node ID, determine whether it is a fixed node or determine whether it can provide real-time network data connectivity to a destination. In an example, a node may store a routing table, and entries in the routing table may include destinations and indicate whether the node has real-time network data connectivity to the destination.

One or more of the methods, functions and operations described herein may be performed by computer hardware, including a processor or other integrated circuit. In some instances, the processor may execute machine readable instructions stored on a non-transitory computer readable medium. The computer hardware may be provided in the terminals, UVs, computers, servers, etc., shown in FIG. 1 of the system 100. The system, methods, functions and operations disclosed herein may be used in a variety of environments and for a variety of purposes, including the environments described above. Other additional purposes or environments may include monitor a pipeline in the oil and gas industry, site exploration (e.g., site survey, site drilling, etc.), manufacturing, transportation (e.g., right of way monitoring, theft monitoring, etc.), package delivery (e.g., food, medicine, equipment, etc.), aerial surveillance (e.g., police/fire department, cartography, photography, film, journalism, real estate, etc.), research (e.g., wildlife, atmosphere, ocean, etc.), remote sensing (e.g., telecommunications, weather, maritime, construction, etc.), disaster relief (e.g., survivors, explore contaminated areas, etc.), environment (e.g., forest fires, threats, etc.), and agriculture (e.g., spray pesticides, crop growth, disease, irrigation level, wild animals, etc.).

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. An unmanned vehicle (UV) system providing network data connectivity, the UV system comprising:
 a plurality of UV nodes, each comprising a hardware communication interface and processor to transmit and receive data in a network comprised of the plurality of UV nodes and other nodes according to a routing protocol; and
 a plurality of fixed nodes with a wired or wireless connection to a destination terminal,
  wherein a UV node of the plurality of UV nodes receives data from a source terminal for transmission to a destination terminal, and when the UV node is within range of a node in the network connected the destination terminal, the UV node transmits the received data to the node within range for forwarding the data to the destination terminal via the network,
  wherein the UV node is programmed with a travel route, and during travel on the programmed travel route, the UV node broadcasts a beacon ID to identify terminals within range of the UV node during its travel on the travel route,
  wherein the UV node receives a connection request from the source terminal in response to the terminal receiving the broadcasted beacon ID, and
  wherein the received connection request includes a terminal ID of the source terminal, and the UV node determines whether the terminal ID is for a terminal expected to be at the UV node's current location on the programmed travel route, and
  if the source terminal is determined to be an expected terminal for the current location, the UV node establishes the connection with the source terminal, and the UV node receives the data from the source terminal after establishing the connection with the source terminal.

2. The UV system of claim 1, wherein the node within range comprises a fixed node of the plurality of fixed nodes or another of the UV nodes.

3. The UV system of claim 1, wherein to establish the connection, the UV node transmits a predetermined identifier to the source terminal, and the UV node receives an acknowledgment response from the source terminal in response to the source terminal determining the predetermined identifier is for an approved node.

4. The UV system of claim 1, wherein if the UV node determines the received terminal ID is not for an expected terminal, the UV node determines whether the terminal is an approved terminal before establishing a connection with the terminal.

5. The UV system of claim 4, wherein if the UV node determines the terminal is an approved terminal, the UV node determines an amount of data to be transmitted to the UV node from the terminal.

6. The UV system of claim 5, wherein the UV node determines whether its travel route is to be modified based on the amount of data to be transmitted to the UV node.

7. The UV system of claim 1, wherein the node within range of the UV node comprises a node connected to the destination terminal via the Internet or another public or private network.

8. The UV system of claim 1, wherein prior to receiving the data from the source terminal, the UV node detects the source terminal through at least one of a planned visit and an unplanned visit occurring during a programmed travel route of the UV node.

9. The UV system of claim 1, wherein the destination terminal comprises an operations office computer located where the UV node starts its travel route.

10. The UV system of claim 1, wherein the UV node is programmed with a travel route, and during travel on the programmed travel route, the UV node establishes network connectivity for a plurality of sensors located in different geographic locations and transmits received sensor data to a remote computer via the network.

11. The UV system of claim 10, wherein the UV node is programmed with commands to transmit to a terminal on the programmed travel route when a network connection is established with the terminal.

12. The UV system of claim 11, wherein the terminal receives the commands from the UV node and executes the commands to control an actuator of the terminal or to execute another action at the terminal.

13. The UV system of claim 10, wherein the remote computer processes the sensor data and determines a new mission plan or a change to a mission plan for the UV node or another UV node based on the processed sensor data.

14. An unmanned vehicle (UV) providing network data connectivity for remote terminals, the UV comprising:
 a processor,
 a communications interface; and
 data storage storing a programmed travel route for the UV, wherein the processor is to:
  facilitate broadcasting of a beacon ID via the communications interface to identify a terminal within range of the UV during its travel on the travel route;
  receive a connection request from a source terminal in response to the source terminal receiving the broadcasted beacon ID, wherein the received connection request includes a terminal ID of the source terminal, and the UV determines whether the terminal ID is for a terminal expected to be at the UV node's current location on the travel route;
 if the source terminal is determined to be an expected terminal for the current location, establish network data connectivity for the source terminal to a network of nodes, including the UV, via the communications interface in response to receiving the connection request; and
 transmit data received from the source terminal to a destination terminal.

15. The UV of claim 14, wherein the data is transmitted directly to the destination terminal from the UV.

16. The UV of claim 14, wherein the data is transmitted to the destination terminal from the UV via intermediate hops in the network of nodes or in the Internet or another public or private network.

17. A non-transitory computer readable medium storing machine readable instructions executable by a processor to:
 broadcast a beacon ID from an unmanned vehicle (UV) providing network data connectivity for remote terminals while the UV is travelling on a programmed travel route;
 receive a connection request from a source terminal in response to the source terminal receiving the broadcasted beacon ID, wherein the received connection request includes a terminal ID of the source terminal;
 determine whether the terminal ID is for a terminal expected to be at the UV node's current location on the programmed travel route;

if the source terminal is determined to be an expected terminal for the current location, establishes a connection with the source terminal to provide network data connectivity for the source terminal;

if the terminal ID is determined not to be for an expected terminal, determine whether the terminal ID is for an approved terminal before establishing network data connectivity for the source terminal; and transmit data received from the source terminal to a destination terminal via the UV node.

* * * * *